June 29, 1948.  J. G. HAWLEY  2,444,043
MASTER CYLINDER
Filed Oct. 27, 1941  3 Sheets-Sheet 1
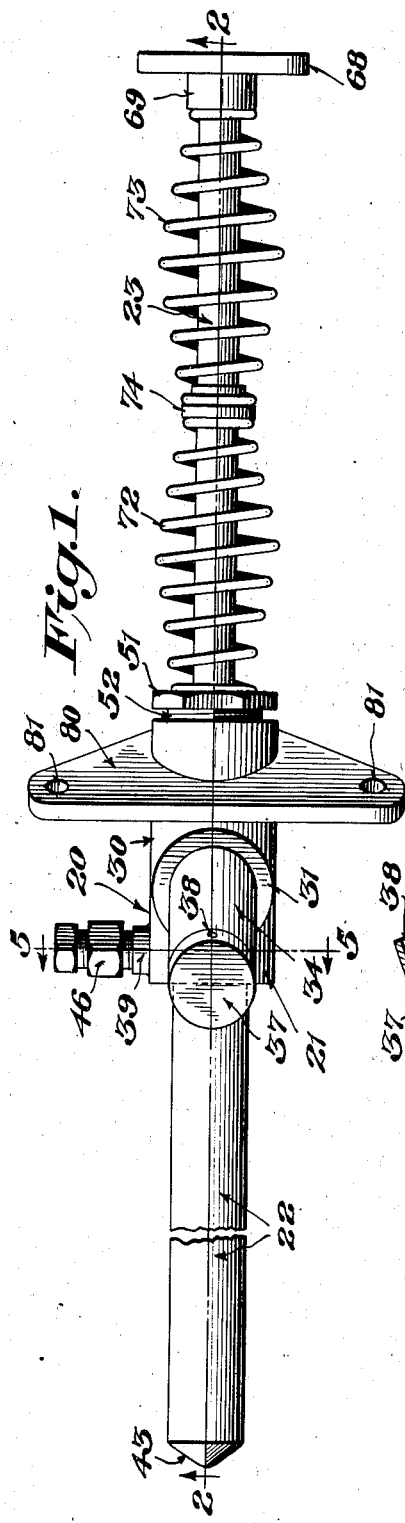
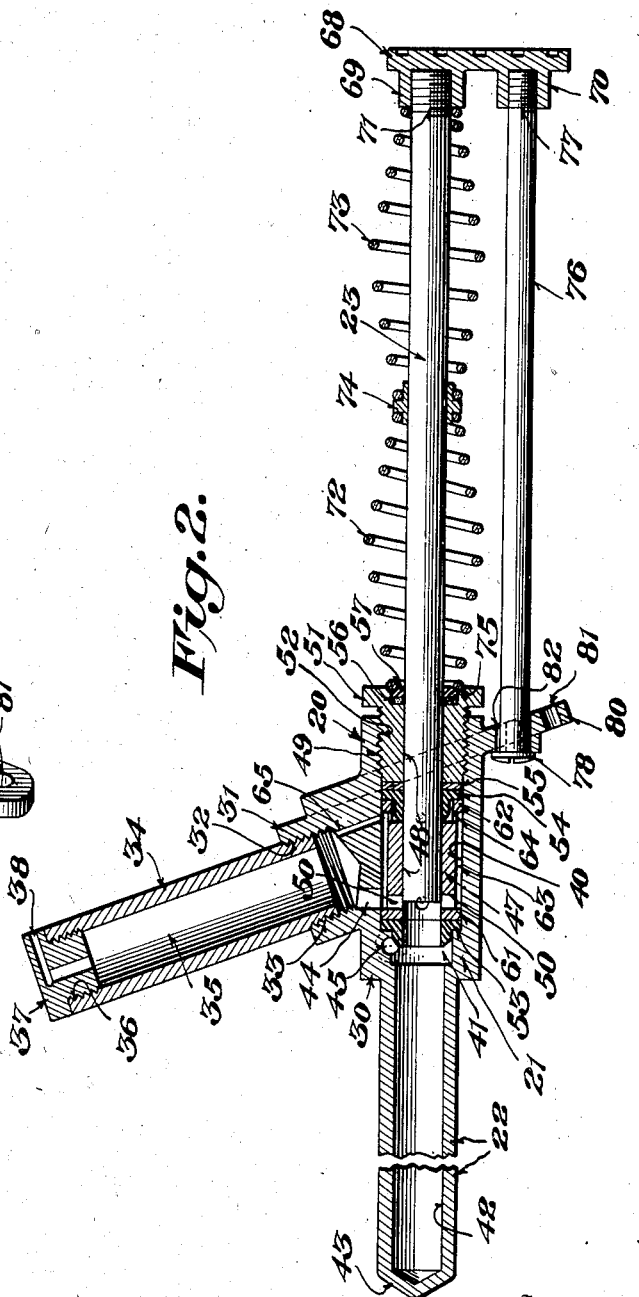
Inventor
Jesse G. Hawley,
By Albert T. St Clair
Attorney June 29, 1948.　　　J. G. HAWLEY　　　2,444,043
MASTER CYLINDER
Filed Oct. 27, 1941　　　　　　　　　　3 Sheets-Sheet 2
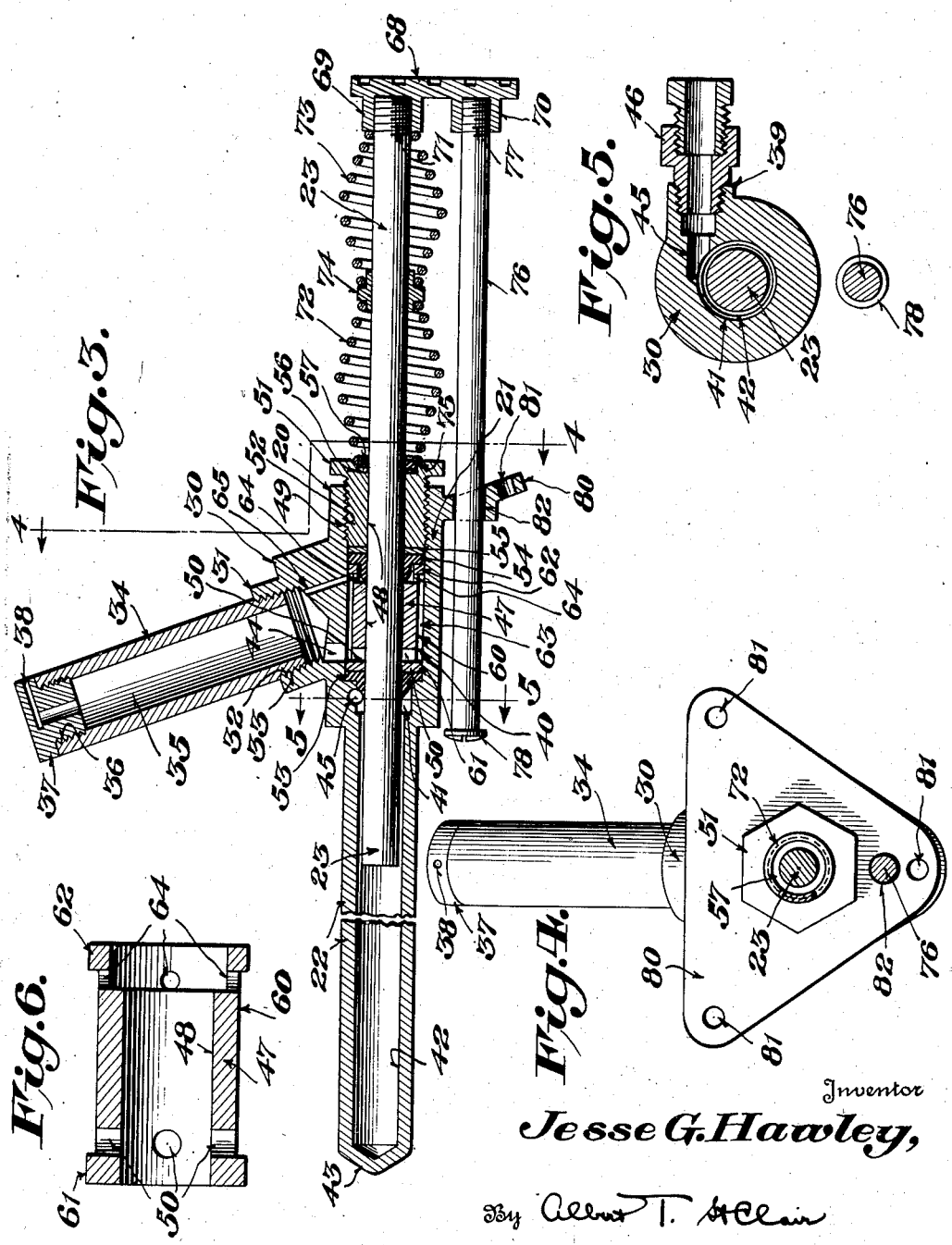
Inventor
Jesse G. Hawley,
By Albert T. St Clair
Attorney June 29, 1948.  J. G. HAWLEY  2,444,043
MASTER CYLINDER
Filed Oct. 27, 1941  3 Sheets-Sheet 3
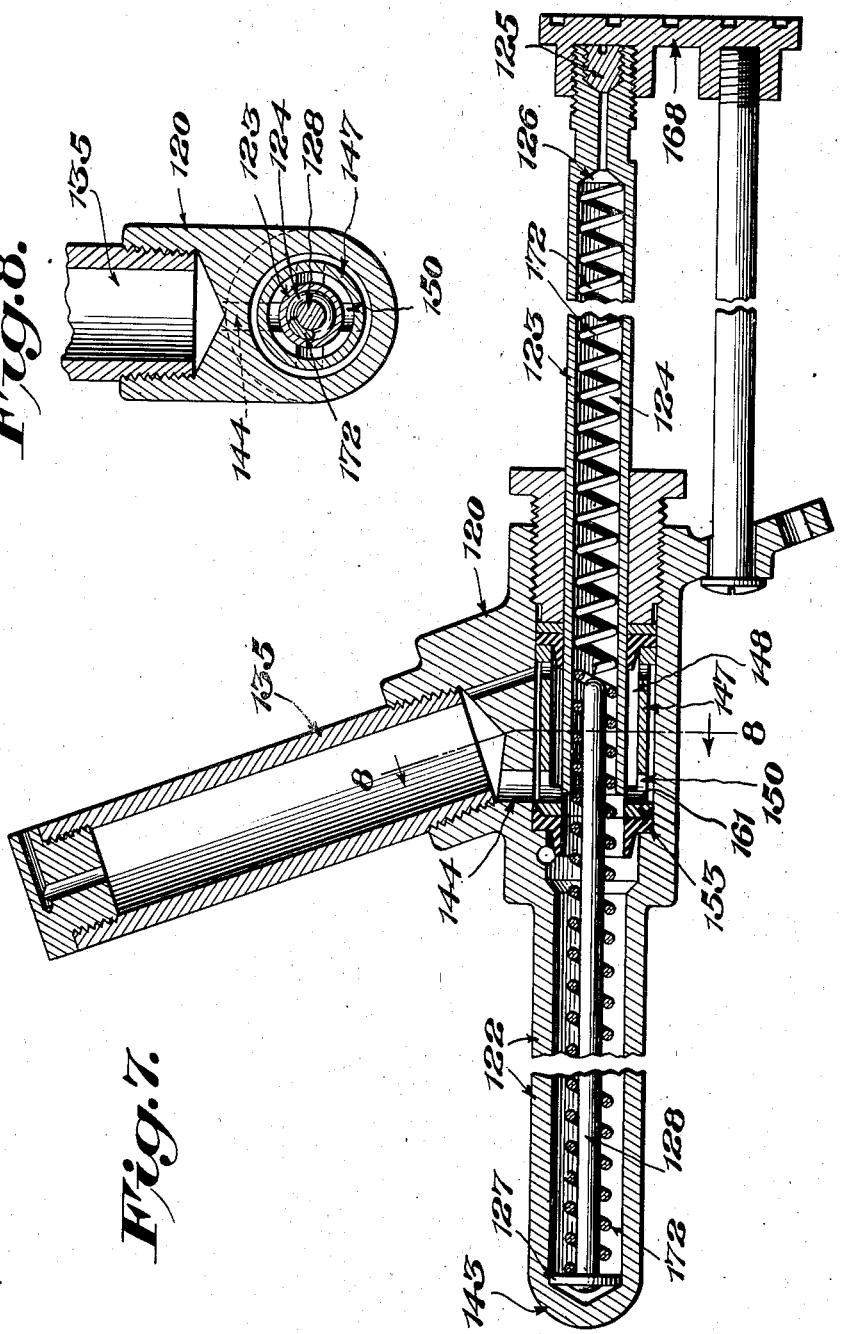
Inventor
Jesse G. Hawley,
By Albert T. St Clair
Attorney Patented June 29, 1948

2,444,043

UNITED STATES PATENT OFFICE 2,444,043

MASTER CYLINDER

Jesse G. Hawley, Painted Post, N. Y.

Application October 27, 1941, Serial No. 416,738

1 Claim. (Cl. 60—54.6)

This invention relates to the art of power units, and more particularly to an improved master cylinder.

Numerous master cylinders have previously been developed, but most of these have been of complicated construction and dependent upon valve mechanisms, with the resultant tendency to leakage.

I have found these difficulties can be overcome and a master cylinder can be produced which is simple in design, efficient in operation, and relatively inexpensive to produce, by the construction disclosed herein.

It is therefor an object of this invention to provide a new and improved master cylinder.

It is another object to provide a mechanically operated master cylinder.

It is a further object to provide a master cylinder which is capable of producing any desired hydraulic pressure.

It is an additional object to provide a master cylinder which is free of valve mechanisms.

It is also an object to provide a simple and inexpensive, single plunger, direct acting master cylinder of general utility.

With the above and other objects in view, which will be apparent as the description proceeds, I have set forth my invention in the following specification and have illustrated it in the accompanying drawings, in which:

Figure 1 is a plan view of my new master cylinder in uncompressed position;

Fig. 2 is a longitudinal vertical section on the line 2—2 of Fig. 1;

Fig. 3 is a corresponding vertical section, but with the master cylinder in completely compressed position;

Fig. 4 is a transverse vertical section on the line 4—4 of Fig. 3;

Fig. 5 is a transverse vertical section, on an enlarged scale, on the line 5—5 of Figs. 1 and 3;

Fig. 6 is a longitudinal vertical section, on an enlarged scale, through a sleeve;

Fig. 7 is a longitudinal vertical section of a modification; and

Fig 8 is a transverse vertical section on the line 8—8 of Fig. 7.

Referring to the accompanying drawings, and particularly to Figs. 1 and 2 thereof, one embodiment of my improved master cylinder 20 preferably comprises a fluid cylinder 21, a high pressure fluid chamber unit 22, and a plunger 23.

As best shown in Figs. 2 and 3, fluid cylinder 21 and high pressure fluid chamber unit 22 are preferably formed integrally as a housing 30, which also has a boss 31, internally threaded at 32 to receive a correspondingly threaded end 33 of a pipe 34, which constitutes a reservoir 35 for the operating fluid (not shown). As also shown in Figs. 2 and 3, the outer end of the reservoir 35 is internally threaded at 36 to receive a correspondingly threaded closure plug 37. The latter is vented at 38 to maintain sufficient contact with the atmosphere to cause the fluid to be fed into the fluid cylinder 21 by gravity. Although no operating fluid has been shown it will be understood that any suitable operating fluid may be used.

The housing 30 is recessed at 40 to form the bore of the fluid cylinder 21, and is provided with a reduced diameter counterbore 41 to provide a fluid receiving recess, and is further counterbored at 42 to provide the chamber of the high pressure fluid chamber unit 22, which is closed at its far end 43.

In practice, I prefer to make the bore 42 of the high pressure fluid chamber unit 22 of slightly greater diameter than the diameter of the plunger 23 to allow the latter to move freely into the former. When the plunger 23 is ½" in diameter, I have found that the bore 42 of the high pressure fluid chamber unit may conveniently be made $\tfrac{9}{16}$".

The boss 31 of housing 30 is provided with a feed hole 44 to communicate with the bore of the cylinder 21.

As shown in Fig. 5, housing 30 also has an internally threaded boss 39 which communicates with a transverse orifice 45 that opens into counterbore 41. Threaded boss 39 is adapted to receive any convenient fitting 46 for the attachment of a tube or pipe (not shown) leading to the brakes, or other object to be actuated by the master cylinder. As shown, this orifice 45 communicates with the counterbore 41 for the discharge of the operating fluid when the plunger 23 is operated, as explained below.

I provide a sleeve 47 of just sufficiently smaller diameter than the main bore of the fluid cylinder 21 to enable it to be inserted into and to fill a substantial portion of that bore and to act as a bearing for the inner end of the plunger 23, this sleeve being provided with a bore 48 of just sufficient diameter to allow the plunger 23 to slide freely therethrough. I also provide the sleeve with a plurality of orifices 50 communicating with the feed hole 44 that communicates with the reservoir 35.

A closure plug 51, threaded at 52 to engage the internal threads 49 at the free end of the housing 30, is provided to constitute a head for my master cylinder. Plug 51 is provided with a bore 48 of the same diameter as the bore 48 in sleeve 47 to form an additional guide bearing for the plunger 23. Suitable gaskets 53 and 54 are provided at the opposite ends of the sleeve 47 to prevent leakage of fluid past the plunger as the latter is reciprocated. An auxiliary metal washer 55 is provided between the gasket 54 and the end of the closure plug 51 to prevent twisting the gasket when the plug is tightened. The closure plug is also preferably provided with an end recess 56, in which a washer 57 is inserted to act as a wiper and keep the plunger free from dust and dirt. Washer 57 may be of any desired type, but is preferably a combined rubber-felt washer with the felt side placed against the closure plug 51.

As best shown in Figs. 2, 3, and 6, the sleeve 47 is provided with a reduced diameter portion 60 extending entirely around its periphery, except at its extreme ends 61 and 62, to provide a fluid receiving recess 63 that facilitates communication, through the aperture 44, between the reservoir 35 and one of the orifices 50, and thence with the reduced diameter counterbore 41 in the housing 30 when the plunger is retracted. There are preferably four of the orifices 50 and a corresponding series of four smaller orifices 64 arranged in line therewith to provide communication with an anti-airlock recess 65 that communicates with the reservoir 35. By providing a series of these orifices 50 and 64, there will always be communication regardless of the circumferential position of the sleeve 47.

A plate 68, provided with two internally threaded bosses 69 and 70, is provided to act as a pedal, boss 69 receiving the threaded end 71 of plunger 23. The plunger is also provided with coiled compression springs 72 and 73 which are telescoped therearound and separated by a spring guide 74. The outer end of spring 72 bears against a recess 75 on the closure plug 51 and the outer end of spring 73 bears against the boss 69 on plate 68 to constitute means for normally retracting the plunger.

The outward travel of the latter is controlled by a pedal stop 76 which is threaded at one end 77 to be received in the boss 70 of the plate 68. At its opposite end, the pedal stop is preferably provided with a screw plug 78 that is threaded into the end of the pedal stop.

As best shown in Figs. 1 and 4, the housing 30 is also provided with an integral peripheral flange 80 of any desired shape, but here shown as being triangular. It has a plurality of orifices 81 for convenience in attaching the master cylinder in any suitable location, such as the floor board (not shown) of an automobile. It is also provided with an additional orifice 82 through which the pedal stop 76 passes, the head of the screw plug 78 serving to stop further withdrawal of the plunger, under the influence of coil springs 72 and 73, by contacting with the triangular flange 80.

As best shown in Figs. 2 and 3, the fluid from reservoir 35 passes through registering orifices 44 and 50 into the bore 40 of the fluid cylinder 21 under the influence of gravity, when the plunger 23 is withdrawn to the position shown in Fig. 2 by coil springs 72 and 73. This tends to fill any vacant space in either the fluid cylinder 21 or the communicating counterbore 41 and the bore 42 of high pressure fluid chamber unit 22.

When it is desired to operate the master cylinder 20, the operator pushes on the pedal plate 68 and forces the plunger 23 inwardly into the housing 30 against the pressure of coil springs 72 and 73. When the plunger is advanced slightly beyond the point shown in Fig. 2, it cuts off further entrance of operating fluid into the counterbore 41 and high pressure fluid chamber unit 22 and displaces an amount of fluid equal to the amount of its penetration beyond the cut-off point, thus forcing the desired amount of fluid out of the counterbore 41 and the high pressure fluid chamber unit 22 through orifice 45 leading to the brakes or other device to be actuated thereby.

As soon as the pressure is removed from the pedal 68, coil springs 72 and 73 withdraw the plunger 23, thus creating a vacuum in the communicating bores which causes some fluid to be withdrawn from the connections leading to the brakes, or other apparatus being actuated, through the orifice 45. After the plunger 23 has been retracted sufficiently to uncover orifices 50, the vacuum allows additional fluid to flow from the reservoir 35 to fill any void thus created in fluid cylinder 21 or fluid chamber unit 22, because the fluid in reservoir 35 is under atmospheric pressure through vent 38.

In Figs. 7 and 8, I have shown another embodiment of my invention which is preferred where especially high pressures are to be developed in the high pressure fluid chamber unit.

As shown, in this modification I utilize a master cylinder 120, which comprises a fluid cylinder 121, a high pressure fluid chamber unit 122, and a plunger 123. These parts generally conform to those in the embodiment already described, except that plunger 123 is provided with a bore 124 and a bleeder 125 adjacent to a pedal plate 168.

In this embodiment, the external springs 72 and 73 are replaced by a single spring 172, which is housed in plunger 123 and high pressure fluid chamber unit 122. At one end, spring 172 bears against a recess 126 in plunger 123 near the plate 168 and at its opposite end against the head 127 of a spring guide 128 that is forced against the closed end 143 of high pressure fluid chamber unit 122 by spring 172. As shown, the spring guide 128 is preferably a small diameter rod, to the other end of which is riveted a washer that constitutes the head 127. This construction provides a longer spring and facilitates getting an even tension for the entire travel of the plunger while allowing it to move its full distance in the high pressure fluid chamber unit.

The bore 124 of plunger 123 is, of course, kept filled with the operating fluid (not shown), and its action is just the same as if it were solid. The bleeder 125 permits the removal of any trapped air.

In this embodiment, the sleeve 47 is replaced by a sleeve 147 of similar shape, except that it has a bore 148 of greater diameter than the bore 48 of the previous embodiment to provide a larger fluid chamber around plunger 123 and remove any possibility of sucking air into the line between the plunger 123 and the sleeve 147 when the plunger return is quicker than the return of the fluid from the brakes. Sleeve 147 is provided with a plurality of orifices 150 for cooperation with an aperture 144, in the fluid cylinder 121, that communicates with a reservoir 135.

The embodiment shown in Figs. 7 and 8 also provides additional means for sealing the high pressure fluid chamber unit 122 and preventing any fluid from being by-passed around the outside of the gasket 53 of the previous embodiment. This is accomplished by chamfering the end 161 of sleeve 147, preferably at a 45° angle, and using a rubber gasket 153 which is molded to conform to the shape of the chamfered end 161 of sleeve 147. With this construction, the more pressure developed in the high pressure fluid chamber unit 122, the tighter this 45° wedge, formed by the gasket 153, is sealed. This construction may be used with either embodiment of my invention.

The other parts of the modification illustrated in Figs. 7 and 8 conform in general to the corresponding parts in Figs. 1–6, and the operation will be clear from the foregoing description.

It will thus be apparent that I have developed a single plunger, direct acting master cylinder of exceedingly simple construction which is free of valves, which comprises mainly cast or drilled parts, or ordinary drill rod, thus eliminating the necessity for expensive machining. The only parts needing reaming are the bores 48 in sleeve 47 and closure plug 51, the bore 124 in plunger 123, and the bore 148 in sleeve 147.

It will also be apparent that this construction results in the production of an immense pressure in the high pressure fluid chamber unit, which may be increased to any desired amount by increasing the travel of the operating pedal. There are no parts to get out of order or valves to be replaced, and there is no danger of leakage.

While the parts can be made of more expensive materials than those disclosed, it will be apparent that, for most purposes, this is unnecessary, and that the master cylinder disclosed is a highly efficient and yet inexpensive construction.

As many apparently widely different embodiments of this invention may be made without departing from the spirit threeof, it is to be understood that I do not limit myself to the foregoing embodiments or description except as indicated in the following claim.

I claim:

A master cylinder, comprising a cylinder, a high pressure fluid chamber, an outlet, a sleeve of substantially the same diameter as the cylinder, the sleeve having a bore the forward end of which is of reduced diameter, a plunger of substantially the same diameter as the forward end of the bore of the sleeve for expelling fluid from said bore and from the high pressure fluid chamber through said outlet, and means for sealing the high pressure fluid chamber, said means comprising a gasket provided with a wedge-shaped edge for cooperation with a wedge-shaped seat on the sleeve and adapted to form a tighter fit when the pressure is increased in the high pressure fluid chamber.

JESSE G. HAWLEY.

REFERENCES CITED

The following references are of record in the file of this patent:

UNITED STATES PATENTS

| Number | Name | Date |
| --- | --- | --- |
| 1,097,632 | Holmes | May 26, 1914 |
| 1,865,561 | Furgason | July 5, 1932 |
| 1,985,588 | Tatter | Dec. 25, 1934 |
| 1,998,821 | Rockwell | Apr. 23, 1935 |
| 2,009,104 | Carroll | July 23, 1935 |
| 2,136,239 | Ernst | Nov. 8, 1938 |
| 2,182,237 | Rasmussen | Dec. 5, 1939 |
| 2,199,863 | Wehr | May 7, 1940 |
| 2,212,248 | Rasmussen | Aug. 20, 1940 |
| 2,289,043 | Rockwell | July 7, 1942 |

FOREIGN PATENTS

| Number | Country | Date |
| --- | --- | --- |
| 444,781 | Great Britain | Mar. 27, 1936 |